Figure 1:
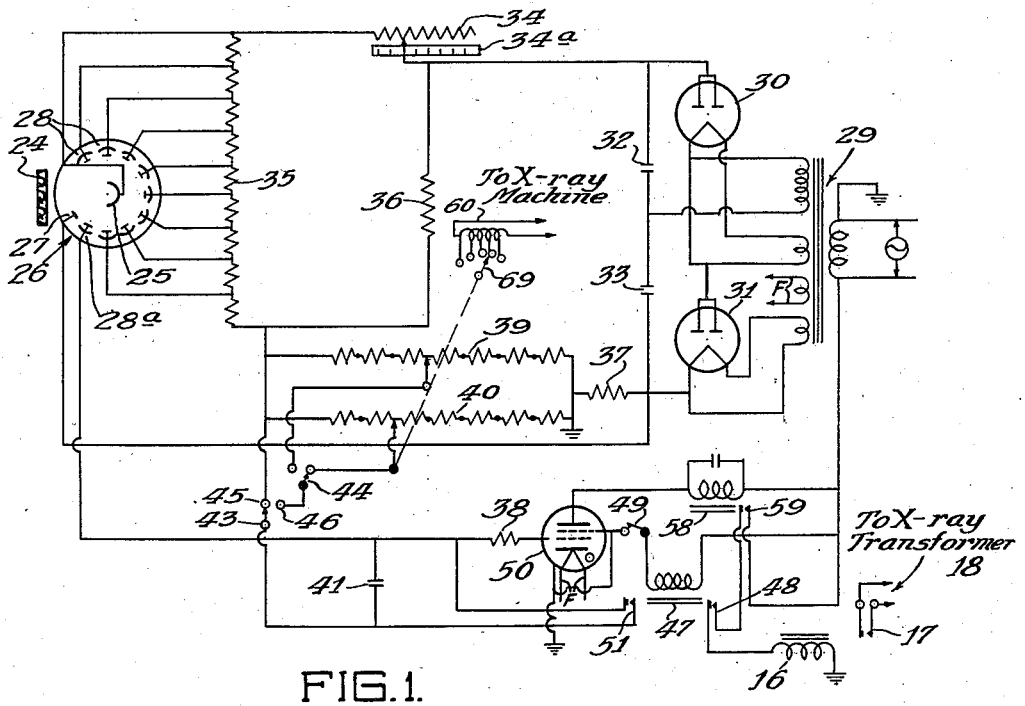

May 28, 1946.   R. H. MORGAN ET AL   2,401,289
PHOTOELECTRIC TIMER FOR ROENTGEN PHOTOGRAPHY
Filed July 22, 1943   2 Sheets-Sheet 1

INVENTORS:
Russell H. Morgan
BY Paul C. Hodges

Robert A. Lavender
Attorney.

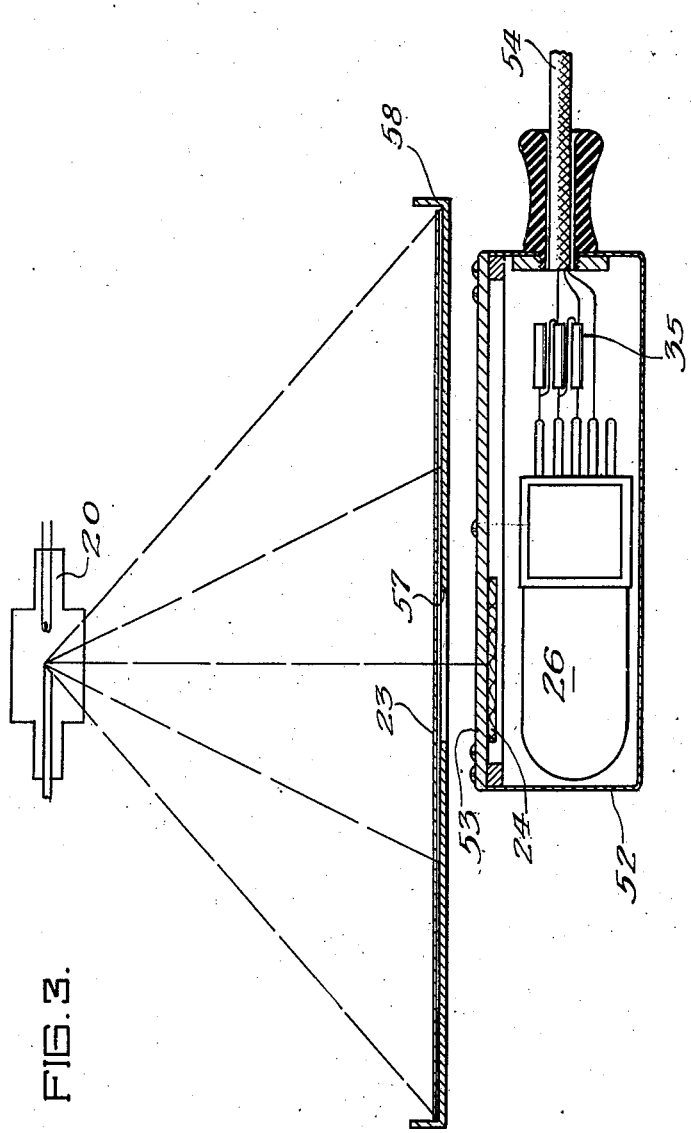

Patented May 28, 1946

2,401,289

UNITED STATES PATENT OFFICE 2,401,289

PHOTOELECTRIC TIMER FOR ROENTGEN PHOTOGRAPHY

Russell H. Morgan and Paul C. Hodges, Chicago, Ill., assignors to the United States of America, as represented by the Director of the Office of Scientific Research and Development Application July 22, 1943, Serial No. 495,689

22 Claims. (Cl. 250—95)

This invention relates to an apparatus, which may be called a photoelectric timer, for automatically terminating Roentgen exposure at the proper time.

One of the most important factors in the production of diagnostically excellent Roentgen photographs, sometimes called roentgenographs, is correct exposure. In most clinics, measurement of the thickness of anatomical structures under examination and, occasionally, patients' weights and ages are the principal guides from which roentgenographic technical data are derived. Unfortunately, these data frequently yield misleading information and the resulting exposed film lacks proper definition.

In a copending application Ser. No. 486,704, filed May 12, 1943, we have described a roentgenographic exposure meter by means of which roentgenographs of proper exposure can be made without the uncertainties encountered in the use of known exposure techniques. In using this device, a phototube assembly is placed beneath the anatomical structure to be roentgenographed or X-rayed; a Roentgen beam is projected through the structure, and the deflection of a meter, which is calibrated in seconds, is observed. The film is then exposed to the same Roentgen beam used in taking the reading for the time indicated by the meter. This device insures satisfactory roentgenographs, but it has the disadvantage that two exposures must be made for every roentgenograph produced.

One object of the present invention is to provide an apparatus with which correctly exposed roentgenographs can be made simply and automatically by closing the switch of the X-ray machine without any preliminary testing exposure.

Another object of this invention is to provide an apparatus that will automatically terminate the exposure when the proper quantity of radiation has been applied to the film, regardless of the potential applied to the X-ray tube or the anatomical structure under examination.

In a preferred embodiment of the present invention a photoelectric cell or phototube assembly is placed beneath or behind the object to be roentgenographed with the film between the object and the phototube assembly. Roentgen rays after passing through the object pass through the film, expose it and are incident on the phototube assembly. In response to this radiation a current that is proportional to the intensity of the radiation effective in exposing the film flows through the phototube and charges a capacitor which is in circuit with a thyratron tube. When the potential of the condenser reaches a predetermined level, the thyratron conducts actuating a relay that breaks the Roentgen tube circuit and terminates the exposure.

Figure 2:
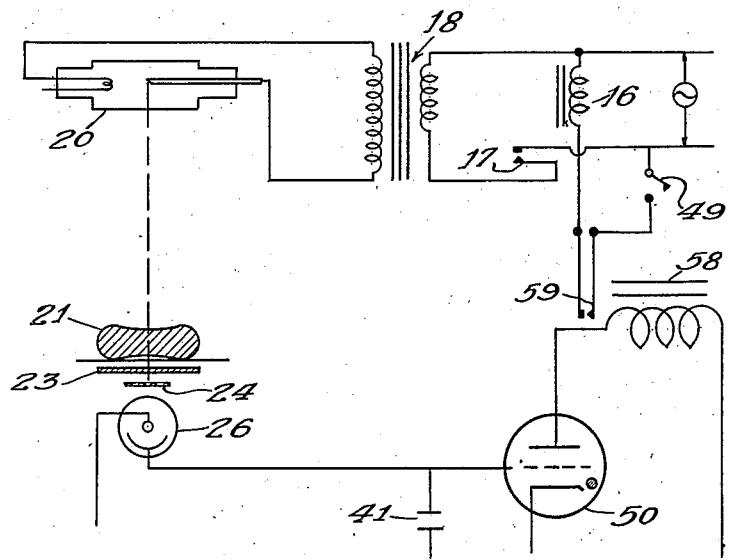

The previously noted and other features of novelty residing in the arrangement of parts and details of construction will be more fully understood by reference to the following detailed description of the invention taken in connection with the accompanying drawings, in which:

Fig. 1 is a schematic diagram of a system for controlling the energization of a Roentgen tube circuit; Fig. 2 is a schematic diagram of a Roentgen tube circuit together with certain simplified details of the control system of Fig. 1; and Fig. 3 is an elevational view, partially in cross section, of the phototube assembly shown in operative relation to a Roentgen tube.

The embodiment of the apparatus illustrated in Fig. 2 comprises an X-ray or Roentgen tube 20 of any suitable construction, connected for energization to the secondary of a conventional transformer 18. A relay 16 is connected across the primary of the transformer 18 for closing the normally open contacts 17. When a starting switch 49 is closed, the relay 16 is energized through contacts 59 of another relay 58.

In superposed operative relation below a suitably supported body 21 to be roentgenographed, there are successively disposed a Roentgen film 23 enclosed in the usual cassette, a fluorescent screen 24, and a phototube 26. In circuit with the phototube 26 are a condenser 41, a thyratron 50, and the relay 58 for operating contacts 59.

When the switch 49 is closed, relay 16 is energized thereby closing contacts 17. This causes energization of the Roentgen tube 20 through the transformer 18, with the result that Roentgen rays from the tube 20 pass through the body 21 and film 23 and are incident on the fluorescent screen 24. The visible radiation produced by the fluorescence of the screen in turn is incident on the phototube 26 causing a current to flow which is proportional to the intensity of the Roentgen radiation effective in exposing the film, as will be noted more in detail hereinafter.

The current from the phototube 26 charges condenser 41 until the potential on the condenser reaches a predetermined value, at which time the thyratron 50 is rendered conductive, relay 58 is energized, and contacts 59 are opened. This opening of contacts 59 in turn de-energizes the relay 16, causing contacts 17 to open and de-energize the Roentgen tube 20, thus terminating the exposure.

The exposure, E, received by a roentgenographic film may be expressed quantitatively as the product of the effective intensity of the incident radiation, G (photographic flux density), and the exposure time, $t$; that is, $$E = Gt \qquad (1)$$

Experiments have shown that the value of E for correct exposure is a constant; thus the conditions for correct exposure are given by the equation, $$Gt = a_c \qquad (2)$$

where $a_c$ is a constant whose value is a function of the speed of the particular roentgenographic film emulsion.

In the circuit shown in Fig. 2 the charge, Q, appearing on the condenser 41 at the end of an exposure is given by the equation, $$Q = it \qquad (3)$$

where $i$ is the average phototube current and $t$ is the exposure time.

If V is the potential of a condenser having a capacity, C, at the instant, $t$, then $$it = CV \qquad (4)$$

It will be shown presently that the phototube current, $i$, in the circuit of our invention is proportional, within the limits used in roentgenography, to the effective intensity of the radiation exposing the film; that is $$i = kG \qquad (5)$$

where $k$ is a constant whose value is a function of phototube sensitivity.

When $i$ is eliminated from Equations 4 and 5

$$Gt = \frac{CV}{k} \qquad (6)$$

Substituting in Equation 2, the film has been properly exposed when $$\frac{CV}{k} = a_c \qquad (7)$$

Equation 7 can therefore be satisfied by suitably adjusting the values of C, V, and $k$. How this may be accomplished will be presently disclosed in describing the preferred embodiment of the invention illustrated in Fig. 1.

In the foregoing discussion it was assumed that the total charge appearing on the condenser 41 was entirely the result of photoelectric action. This, however, is not entirely true. Small quantities of charge are collected from the control grid of the thyratron 50 and through the insulation of the phototube and wiring system. For satisfactory operation, however, this stray charge must not be greater than 10% of the charge produced by the photoelectric current; otherwise the phototimer will tend to act prematurely. This criterion is difficult to fulfill with ordinary phototubes, because their current output under roentgenographic conditions is very small. However, certain multiplier type phototubes, which may be of the type disclosed in United States Letters Patent 2,231,697 to Vladimir K. Zworykin et al., have a current output of several microamperes even when activated by the small radiation intensities employed in roentgenography, and thus may be advantageously used in the apparatus of the present invention.

Turning now to the preferred embodiment of the invention in Fig. 1, a phototube 26 of the multiplier type is shown, which contains a light sensitive cathode 25, an anode 27, and a series of multiplying electrodes 28 hereinafter called dynodes. These dynodes are shown for convenience in Fig. 1 arranged on one radius. Actually, as illustrated in Letters Patent 2,231,697, the dynodes are in a spaced staggered relation. If radiation is incident upon the photocathode 25, photoelectrons will be emitted in a quantity determined by the instantaneous effective intensity of the radiation. These photoelectrons will be accelerated toward the first dynode and because of the design of the tube and voltage distribution, will impinge upon the first dynode. The photoelectrons striking the first dynode 28 will cause the emission of secondary electrons, the number of secondary electrons emitted being dependent, in part at least, upon the magnitude of the potential between it and the cathode 25. The trajectory of the secondary electrons is such that they impinge upon the curved surface of the second dynode. Here again, a multiplication, by reason of secondary emission, is secured, and this is repeated until the amplified stream of secondary electrons from the ninth dynode 28a is collected upon the anode 27. Since the number of secondary electrons emitted is partially dependent upon the magnitude of the potential between adjacent electrodes, the sensitivity of the tube which is represented by $k$ in Equation 7, may be controlled by varying the potential distribution between the electrodes of the tube.

To insure optimum performance of the phototube 26, the potential distribution among the dynodes 28 should be substantially in agreement with that expressed by a mathematical series of 1V, 2V, 3V, etc. where 1V is the potential drop between the cathode 25 and the first dynode, and 2V, 3V, 4V, etc. represent the potential drops between the respective succeeding dynodes, in point of electron travel, and said cathode.

This potential distribution is provided in the system of Fig. 1 by connecting the cathode 25 to the negative terminal of resistor 35, and connecting the first dynode 28 to a point on the resistor which is more positive. The other dynodes 28, except the ninth dynode 28a, are connected to successively more positive points on the resistor 35. By adjusting a variable resistor 34, which as shown is in series with resistor 35, the potential applied to the cathode and the eight dynodes is varied, and, as has been explained, this changes the secondary emission and thus controls the sensitivity of the tube 26. A scale or other position indicator 34a of the variable resistor 34 is calibrated in terms of film speed so that the sensitivity of the multiplier tube is adjusted for different films by merely setting the pointer of the resistor 34 on the calibrated point corresponding to the film speed as given by the manufacturer for the particular film used. Thus $k$ of Equation 7 may be satisfied by setting the variable resistor 34.

The ninth dynode 28a rather than the anode 27 is connected to the control electrode of the thyratron. This is necessary because the charge which is delivered by the anode 27, if placed on the condenser 41, would be of the wrong sign to fire the thyratron 50. The charging circuit for the condenser 41 may be traced from the ninth dynode 28a, through the condenser 41, switch 43, contact 45, parallel resistances 39 and 40, series resistance 37, and the anode 27. In progressively charging the condenser 41 by this circuit a positive charge is placed on the condenser terminal connected to the control grid of thyratron 50. This control grid is initially biased negatively beyond cutoff and thus the progressive increase in positive charge will tend to make the grid bias more positive until the tube reaches cutoff and fires.

The source of power for the photoelectric timer of this invention should be a stabilized source of alternating current which may be obtained from the primary filament circuit of the X-ray machine. The voltage from this source is stepped-up by the transformer 29 and the voltage doubling circuit comprising the rectifiers 30, 31 and the condensers 32, 33. It will also be noted that the filament of thyratron 50 has energizing connections F, F with transformer 29. Phototube 26 and thyratron 50 grid potentials are supplied from the doubling circuit through the resistor network 34, 35, 36, 37, 39 and 40.

The resistors 39 and 40 in conjunction with switches 43 and 44 are used to compensate for variables in roentgenographic technique. Their function will be further explained hereinafter. One terminal of the condenser 41 is connected to switch 43 and may be connected directly or through resistors 39 or resistor 40 to the resistor 35.

In order for the photoelectric timer to satisfy Equations 6 and 7, its response must be proportional to the effective intensity G (photographic flux density) of the radiations received by the film; and the instrument must be independent of Roentgen quality within the range of conditions with which it is used. If these conditions are fulfilled the photoelectric timer will have a response proportional to the response of the film which is being exposed.

The degree to which this criterion is fulfilled depends to a large extent on the fluorescent screen 24 used in conjunction with phototube 26. We have discovered that a zinc sulphide screen, such as a Patterson Fluorazure screen, when mounted behind the casette and in front of the phototube will give the timer such a response. The Fluorazure intensifying screen is a zinc sulphide screen manufactured and marketed by the Patterson Screen Company of Towanda, Pennsylvania. If films are to be exposed without intensifying screens the response of the timer equipped with a Patterson Fluorazure screen is proportional to the response of the film, and is independent of radiation quality. No compensation under these circumstances need be made for a change in the voltage of the X-ray tube. However, if the films are exposed with intensifying screens so that radiations pass through these screens as well as the film before impinging on fluorescent screen 24, we have found that the response of the photoelectric timer is independent of radiation quality only under those conditions generally encountered in clinical roentgenology. Furthermore, when intensifying screens are employed with the film the response of the phototimer is a function of the voltage applied to the Roentgen tube and of the presence or absence of a Potter-Bucky diaphragm. Compensation for a change in tube voltage and for the use of a Potter-Bucky diaphragm may be made by changing the bias of the control grid of the thyratron 50. Due to the characteristics of the thyratron, if the initial bias of the control grid is changed, the amount of charge on condenser 41 necessary to fire the thyratron will also be changed.

As is shown in Fig. 1, the bias voltage for this control grid is determined by the voltage drop across the resistors 39 and 40. If the film is to be exposed without intensifying screens and without a Potter-Bucky diaphragm, switch 43 is engaged with contact 45 so that the bias voltage on the control grid will be equal to the full voltage drop across the resistors 39 and 40 in parallel. If the film is to be exposed with intensifying screens, but not with a Potter-Bucky diaphragm then switch 43 is engaged with contact 46 and switch 44 is connected to resistor 40. Now the bias potential on the control grid of thyratron 50 is equal to the voltage drop across the portion of the resistance 40 from the grounded point to the movable arm of the variable resistor. If the film is to be exposed with both intensifying screens and a Potter-Bucky diaphragm then switch 43 is engaged with contact 46 and switch 44 is connected to resistor 39. In this case the bias potential on the control grid of thyratron 50 is equal to the voltage drop across the portion of resistor 39 from the grounded point to the movable arm of said resistor.

The control shafts of the variable resistors 39 and 40 are connected for synchronous movement to the main potential selector switch 59 of the auto-transformer 60 of the X-ray machine, and the switch 44 is connected to the switch on the X-ray machine which controls grid or non-grid techniques. Therefore, when the operator selects a voltage on the X-ray machine, resistors 39 and 40 are automatically set for the correct voltage drop which will make the timer operate at the correct instant. Likewise, the operator merely throws the switch for grid or non-grid technique and no further compensation for these factors by him is necessary.

The phototimer in the embodiment of Fig. 1 controls the X-ray machine through the relays 47 and 58. When the starting switch 49 is closed, relay 47 is energized, opening contacts 51 and closing contacts 48. Current flowing through the circuit including contacts 48 and the normally engaged contacts 59 energizes the main relay 16 of the X-ray machine closing contacts 17 and beginning the exposure. The exposure is terminated when the thyratron 50 fires, energizing relay 58, opening contacts 59 thereby de-energizing relay 16, which in turn de-energizes the X-ray tube 20. When switch 49 is opened, relay 47 is de-energized, closing contacts 51, which short circuits the condenser 41 and de-ionizes the thyratron 50. Thus the timer is automatically set for the next exposure.

Fig. 3 discloses in detail the mounting of phototube 26. The phototube assembly with the resistance 35 is mounted in a lightproof case 52 directly beneath an aperture 57 in the film tray 58 of the X-ray table (not shown). The walls and bottom of the case 52 may be of any convenient material, for example, sheet steel. The top 53 of the case may be Bakelite, or any other suitable material which has a low X-ray absorption. The fluorescent screen 24 is mounted within the case 52 directly over the light sensitive surface of the phototube 26. A cable 54 connects the phototube assembly in circuit with the other elements of the timer which are preferably mounted in the control stand of the X-ray machine.

The operation of an X-ray machine equipped with our photoelectric timer is quite simple. To make an X-ray picture, a film 23 is inserted in the film tray 58, the X-ray machine adjusted to any reasonable voltage for the structure to be examined, the pointer of the potentiometer 34 is moved to the known film-speed number of the film used, the switch 43 is set in screen or no-screen position; and if a screen is used switch 44 is set for grid or no-grid technique, and the starting switch 49 is then closed. Exposure will be terminated automatically when the film is properly exposed. All calculations of roentgenographic technical factors, critical adjustments of X-ray tube potential, setting and observation of mechanical timing devices, etc., are eliminated entirely.

Obviously, many changes and modifications in the described photoelectric timer will be apparent to those skilled in the art. For that reason the description is intended to be illustrative only, and the scope of the invention is to be limited only as required by the following claims.

Having thus described our invention, what we claim as novel and desire to secure by Letters Patent of the United States is:

1. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses the Roentgen film, a capacitor in circuit with said cell adapted to be progressively charged in accordance with the response of said cell to radiatin incident upon said cell, and means responsive to a potential of said capacitor corresponding to a proper exposure of the Roentgen film for de-energizing said X-ray tube.

2. An X-ray apparatus for automatically taking roentgenographs of proper exposure, comprising in combination an X-ray tube, means including a fluorescent screen and a photoelectric cell positioned to receive radiation from the X-ray tube after traversing the Roentgen film, said means having a response proportional to the intensity of the radiation effective in exposing the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube.

3. An X-ray apparatus for automatically taking roentgenographs of proper exposure, comprising in combination an X-ray tube, means including a photoelectric cell having an adjustable sensitivity, said means having a response proportional to the intensity of the radiation effective in exposing the Roentgen film said means being positioned to receive radiation from said X-ray tube after said radiation traverses the Roentgen film, means operable to adjust the sensitivity of the cell in accordance with the speed of the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube.

4. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube, the said last mentioned means including a thyratron and an input circuit for said thyratron incorporating said capacitor.

5. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube, the said last mentioned means including a thyratron, an input circuit for said thyratron incorporating said capacitor, and a variable source of bias voltage for compensating for changes in roentgenographic conditions.

6. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses the Roentgen film, and means responsive to the incidence of radiation on said cell sufficient to insure the proper exposure of a Roentgen film for de-energizing said X-ray tube.

7. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses the Roentgen film, means for adjusting the sensitivity of the photoelectric cell to correspond to the speed of the Roentgen film being used, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube, at least 90 per cent of the potential on said capacitor originating on said photoelectric cell.

8. An X-ray apparatus for automatically taking roentgenographs of proper exposure, comprising in combination an X-ray tube, means including a fluorescent zinc sulfide screen and a photoelectric cell positioned to receive radiation from the X-ray tube after traversing the Roentgen film and having a response proportional to the intensity of the radiation effective in exposing the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube.

9. An X-ray apparatus for automatically taking roentgenographs of proper exposure, comprising in combination an X-ray tube, means including a fluorescent screen and a multiplier type photoelectric cell positioned to receive radiation from the X-ray tube after traversing the Roentgen film and having a response proportional to the intensity of the radiation effective in exposing the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube.

10. An X-ray apparatus for automatically taking roentgenographs of proper exposure, comprising in combination an X-ray tube, means including a fluorescent zinc sulfide screen and a multiplier type photoelectric cell positioned to receive radiation from the X-ray tube after traversing the Roentgen film and having a response proportional to the intensity of the radiation effective in exposing the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube, the said last mentioned means including a thyratron and an input circuit for said thyratron incorporating said capacitor, the input circuit for said thyratron being such that at least 90 per cent of the potential on said capacitor has its origin on said photoelectric cell.

11. An X-ray apparatus for automatically taking roentgenographs of proper exposure, comprising in combination an X-ray tube, means including a photoelectric cell having an adjustable sensitivity and a response proportional to the intensity of the radiation effective in exposing the Roentgen film, said means being positioned to receive radiation from said X-ray tube after said radiation traverses the Roentgen film, means operable to adjust the sensitivity of the cell including a variable resistance and an indicator for said variable resistance calibrated in terms of Roentgen film speed, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube.

12. An X-ray apparatus for automatically taking roentgenographs of proper exposure, comprising in combination an X-ray tube, radiation responsive means including a photoelectric cell positioned to receive radiation from said X-ray tube after said radiation has traversed the Roentgen film, said means having a response to Roentgen radiation parallel to the response of the Roentgen film over the portion of the X-ray spectrum used in roentgenography, and means responsive to the incidence of radiation on said cell sufficient to insure the proper exposure of a Roentgen film for de-energizing said X-ray tube.

13. An X-ray apparatus for automatically taking roentgenographs of proper exposure, comprising in combination an X-ray tube, means including a photoelectric cell provided with a cathode, an anode and a series of multiplier electrodes, said means having a response proportional to the intensity of the radiation effective in exposing the Roentgen film, a capacitor in circuit with the anode and a multiplier electrode in advanced position in the series of said cell, said capacitor adapted to be progressively charged in accordance with the response of said cell to radiation incident upon said cell, and means responsive to a potential of said capacitor corresponding to a proper exposure of the Roentgen film for de-energizing said X-ray tube.

14. An X-ray apparatus for automatically taking roentgenographs of proper exposure, comprising in combination an X-ray tube, means for controlling the voltage on said X-ray tube, means including a photoelectric cell having a response proportional to the intensity of the radiation effective in exposing the Roentgen film, a capacitor in circuit with said cell adapted to be progressively charged in accordance with the response of said cell to radiation incident upon said cell, and means responsive to a potential of said capacitor corresponding to a proper exposure of the Roentgen film for de-energizing said X-ray tube, the said last-mentioned means including a thyratron and an input circuit for said thyratron incorporating said capacitor, and means for controlling the bias voltage on said thyratron, said bias voltage control means being simultaneously adjustable with the means for controlling the voltage on the X-ray tube.

15. An X-ray apparatus for automatically taking roentgenographs of proper exposure, comprising in combination an X-ray tube, means for controlling the voltage on said X-ray tube, means including a fluorescent screen and a photoelectric cell positionable to receive radiation from the X-ray tube after traversing the Roentgen film and having a response proportional to the intensity of the radiation effective in exposing the Roentgen film, means including a variable resistance operable to adjust the sensitivity of the cell to correspond to the Roentgen film speed, a capacitor in circuit with said cell adapted to be progressively charged in accordance with the response of said cell to radiation incident upon said cell, means responsive to a potential of said capacitor corresponding to a proper exposure of the Roentgen film for de-energizing said X-ray tube, the said last-mentioned means including a thyratron and an input circuit for said thyratron incorporating said capacitor, and means for controlling the bias voltage on said thyratron in accordance with the voltage on said X-ray tube.

16. An X-ray apparatus for automatically taking roentgenographs of proper exposure comprising in combination an X-ray tube, a film cassette, a lightproof casing mounted behind said film cassette, means having a response proportional to the response of the Roentgen film over the range of radiation used in roentgenography said means including a photoelectric cell within said casing, and means responsive to the incidence of radiation on said cell sufficient to insure the proper exposure of a Roentgen film for de-energizing said X-ray tube.

17. An X-ray apparatus for automatically taking roentgenographs of proper exposure comprising in combination an X-ray tube, a film cassette, a lightproof casing mounted behind said film cassette, radiation measuring means including a fluorescent screen and a photoelectric cell arranged within said casing to receive radiation from said X-ray tube in the order recited said means having a response proportional to the intensity of the radiation effective in exposing the Roentgen film, and means responsive to the incidence of radiation on said cell sufficient to insure the proper exposure of a Roentgen film for de-energizing said X-ray tube.

18. An X-ray apparatus for automatically taking roentgenographs of proper exposure, comprising in combination an X-ray tube, means including a photoelectric cell, said means being positioned to receive radiation that has traversed the Roentgen film and having a response proportional to the intensity of the radiation effective in exposing the Roentgen film, a capacitor in circuit with said cell adapted to be progressively charged in accordance with the response of said cell to radiation impinging upon it, and means responsive to a potential of said capacitor corresponding to a proper exposure of the Roentgen film for de-energizing said X-ray tube, the latter means including a thyratron, an input circuit for said thyratron incorporating said capacitor, a plurality of selectable resistors, means for selectively connecting said resistors into said input circuit, to provide proportional response with one resistor in circuit when a film is exposed with intensifying screens, and a proportional response with a second resistor in circuit when a film is exposed with intensifying screens through a Potter-Bucky diaphragm.

19. An X-ray apparatus for automatically taking roentgenographs of proper exposure, comprising in combination an X-ray tube, means including a photoelectric cell with a response proportional to the intensity of the radiation effective in exposing the Roentgen film, said means being positioned to receive radiation from said X-ray tube after said radiation traverses a space occupied by the subject being roentgenographed, a capacitor in circuit with said cell adapted to be progressively charged in accordance with the response of said cell to radiation incident upon said cell, and means responsive to a potential of said capacitor corresponding to a proper exposure of said Roentgen film for de-energizing said X-ray tube.

20. An X-ray apparatus for automatically taking roentgenographs of proper exposure, comprising in combination with an X-ray tube, means including a fluorescent screen and a photoelectric cell positioned to receive radiation from the X-ray tube after said radiation traverses a space occupied by the subject being roentgenographed, a capacitor in circuit with said cell adapted to be progressively charged in accordance with the response of said cell to radiation incident upon said cell, and means responsive to a potential of said capacitor corresponding to a proper exposure of said Roentgen film for de-energizing said X-ray tube.

21. X-ray apparatus comprising an X-ray tube, a film and fluorescent means positioned to be simultaneously exposed in accordance with X-radiation from said tube after said X-radiation has passed through a space occupied by a subject, a photoelectric cell positioned to receive light radiation from said fluorescent means during exposure to said radiation, the combined response of said cell and said fluorescent means being proportional to the intensity of the radiation effective in exposing said film, a capacitor in circuit with said cell adapted to be progressively charged in accordance with the response of said cell to light incident on said cell, and means responsive to a potential of said capacitor corresponding to a proper exposure of said film for de-energizing said X-ray tube.

22. X-ray apparatus comprising an X-ray tube, fluorescent means positioned to be energized by X-radiation that has passed through a space occupied by a subject, a film positioned to be exposed by light radiation emitted from said fluorescent means when energized, a photoelectric cell positioned to receive light radiation from said fluorescent means created as a result of the X-radiation from said tube after having passed through said space, the combined response of the fluorescent means affecting the cell and said cell being proportional to the intensity of radiation effective in exposing said film, a capacitor in circuit with said cell adapted to be progressively charged in accordance with the response of said cell to the radiation incident on said cell, and means responsive to a potential of said capacitor corresponding to a proper exposure of said film for de-energizing said X-ray tube.

RUSSELL H. MORGAN.
PAUL C. HODGES.